United States Patent
Poduska

(10) Patent No.: US 7,191,274 B1
(45) Date of Patent: Mar. 13, 2007

(54) METHOD AND SYSTEM FOR PROVIDING INDEPENDENT SERVER FUNCTIONALITY IN A SINGLE PERSONAL COMPUTER

(75) Inventor: Matthew J. Poduska, Center Point, IA (US)

(73) Assignee: Crystal Group Inc., Hiawatha, IA (US)

( * ) Notice: Subject to any disclaimer, the term of this patent is extended or adjusted under 35 U.S.C. 154(b) by 1209 days.

(21) Appl. No.: 09/682,323

(22) Filed: Aug. 20, 2001

(51) Int. Cl.
*G06F 13/00* (2006.01)
(52) U.S. Cl. ...................... 710/300; 710/301
(58) Field of Classification Search .......... 710/300, 710/301, 302, 104; 709/238, 250; 312/223.2; 361/683, 803
See application file for complete search history.

(56) References Cited

U.S. PATENT DOCUMENTS

| | | | | |
|---|---|---|---|---|
| 5,852,725 A | * | 12/1998 | Yen | 710/301 |
| 6,490,156 B2 | * | 12/2002 | Chen | 361/686 |
| 6,591,324 B1 | * | 7/2003 | Chen et al. | 710/302 |
| 6,611,423 B2 | * | 8/2003 | Chen | 361/683 |
| 6,611,870 B1 | * | 8/2003 | Asano et al. | 709/238 |
| 6,668,251 B1 | * | 12/2003 | Goldberg | 707/5 |
| 6,691,295 B2 | * | 2/2004 | Williams | 716/12 |

* cited by examiner

*Primary Examiner*—Khanh Dang
(74) *Attorney, Agent, or Firm*—Simmons Perrine PLC

(57) ABSTRACT

A system and method for providing the functionality of independent dedicated servers in a space savings and heat dissipation limited design, including a PC having a plurality of independent dedicated server cards which do not communicate over the PC system bus and only receive power therefrom. Communication with the server cards is done by independent pin connections on the exterior of the PC housing.

11 Claims, 1 Drawing Sheet

METHOD AND SYSTEM FOR PROVIDING INDEPENDENT SERVER FUNCTIONALITY IN A SINGLE PERSONAL COMPUTER

BACKGROUND OF INVENTION

In recent years, industrial personal computers have become increasingly prevalent in many industries. It is not uncommon today to see installations with rows of industrial PCs arranged in racks. Many of these PCs are independent servers dedicated to a single function, such as email, web serving, file storage, and DNS.

While these independent dedicated servers have been used extensively in the past, they do have some drawbacks. First of all, they typically consume extensive space. Secondly, they generate much heat, owing, at least in part, to the fact that each independent server typically has associated with it a power supply which generates heat.

Consequently, there exists a need for improved methods and computer systems for providing independent dedicated server functions.

SUMMARY OF INVENTION

It is an object of the present invention to provide a system and method for providing independent dedicated server functionality in an efficient manner.

It is a feature of the present invention to utilize a single PC chassis with a plurality of servers disposed on independent dedicated expansion cards having industry standard interconnections.

It is another feature of the present invention to include a shared power supply.

It is another feature of the present invention to exclude inter-card communication over the system bus.

It is an advantage of the present invention to achieve improved efficiency in providing independent dedicated server functionality.

It is another advantage of the present invention to increase a system's functionality without a need to reconfigure existing system software.

It is yet another advantage to take advantage of a system's unused functionality without taxing existing limitations on the system bus.

The present invention is an apparatus and method for providing independent dedicated server functionality designed to satisfy the aforementioned needs, provide the previously stated objects, include the above-listed features, and achieve the already articulated advantages. The present invention is carried out in a "wasted space-less" and "wasted heat-less" manner in a sense that the space consumed and heat generated by multiple independent dedicated PC servers in a rack have been greatly reduced.

Accordingly, the present invention is a system and method including a PC having a plurality of independent dedicated servers on industry standard PC expansion cards, where there is no communication between the servers over a system bus disposed in the PC.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
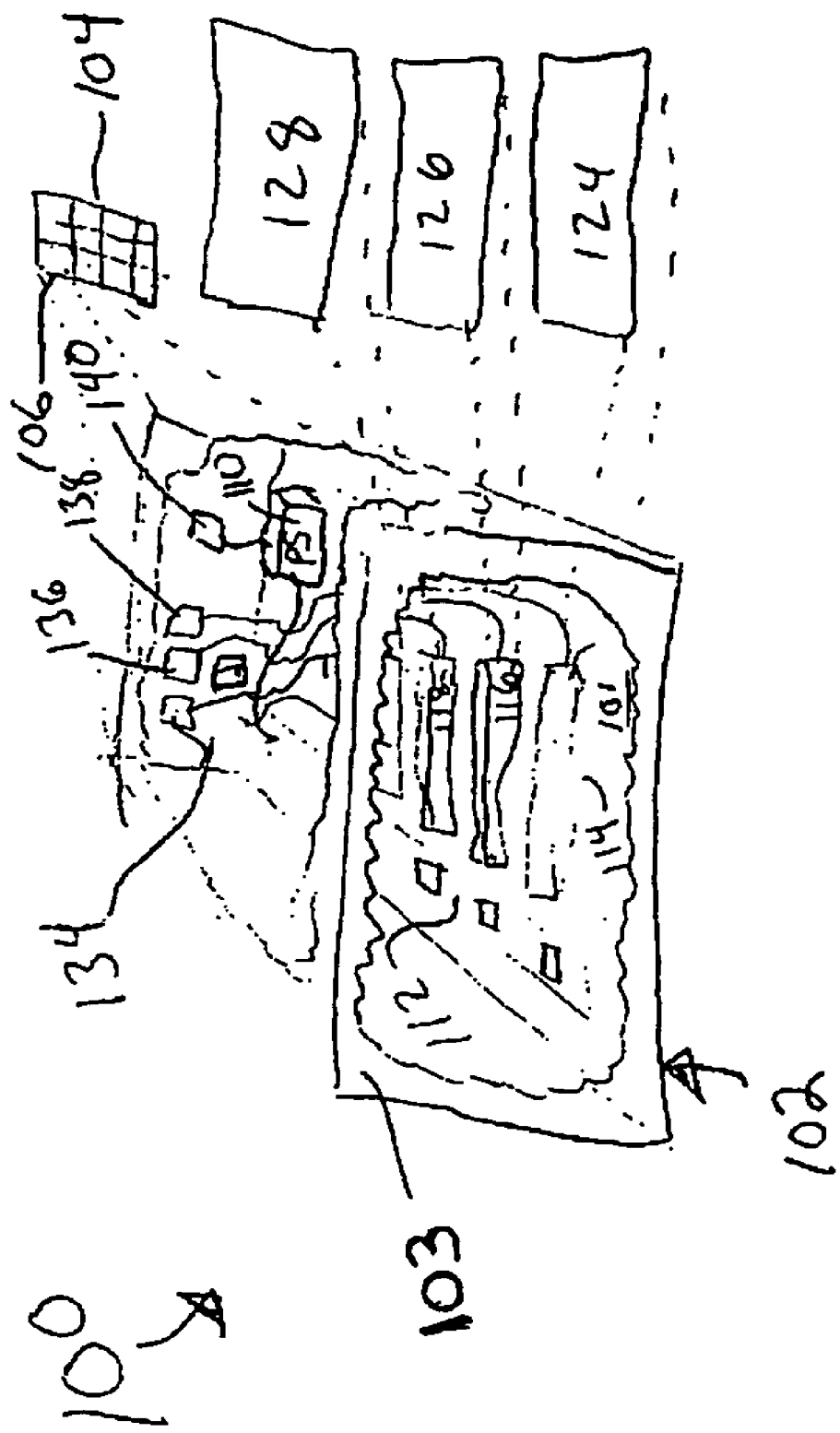
FIG. 1 is an exploded cut-away perspective view of a system of the present invention.

Now referring to the drawing, there is shown a system of the present invention, generally designated 100, including an industrial PC 102, for insertion into a rack 104, having an empty slot 106 therein. The PC housing 102 is shown, via dotted lines, as being removable from and insertable in rack 104 having an empty slot 106 therein. PC housing 102 is shown having a shared power supply 110 which can be any type of known power supply. It may have single or multiple outputs, depending upon the particular requirements of any system. Shared power supply 110 is shown coupled to a power distribution line 112. This is preferably part of an industry standard connection system, such as ISA, compact PCI or PCI or any other industry standard expansion slot/card coupling convention. The terms "industry standard" are known in the art to mean design specifications which are established by some industry organization and adhered to by numerous manufacturers to assure compatibility. The terms "ISA" and "PCI" are well known in the art to refer to an established interface design. When "ISA" and "PCI" are used in this document, those terms are used to denote such existing and well-known specifications. First industry standard expansion card slot 114, second industry standard expansion card slot 116, and third industry standard expansion card slot 118 are coupled to said PC housing 102, which has a chassis 101 and a shroud or cover 103 which, in combination with said chassis 101, forms an enclosure around first industry standard expansion card having an independent dedicated server function 124, second industry standard expansion card having an independent dedicated server function 126, and third industry standard expansion card having an independent dedicated server function 128, which are shown as exploded from first industry standard expansion card slot 114, second industry standard expansion card slot 116, and third industry standard expansion card slot 118 respectively. When first industry standard expansion card having an independent dedicated server function 124, second industry standard expansion card having an independent dedicated server function 126, and third industry standard expansion card having an independent dedicated server function 128 are coupled inside PC housing 102, they are each preferably coupled to power distribution line 112, which has power connections in registration with the slots 114, 116 and 118. In the alternative, power distribution line 112 could be accomplished by a power line in a main section of the slots 114, 116 and 118.

Preferably, the first industry standard expansion card having an independent dedicated server function 124, second industry standard expansion card having an independent dedicated server function 126, and third industry standard expansion card having an independent dedicated server function 128 are unique server cards that each perform a single unique server function, such as email, web serving, file storage, and DNS, etc. Preferably, there are no direct communication connections between the cards 124, 126 and 128 via an internal system bus. This allows for insertion of a new server card without the need to make changes to the system software and without any interference in the communication of signals in and out of other independent dedicated server cards in the PC housing 102.

Each of the cards, first industry standard expansion card having an independent dedicated server function 124, second industry standard expansion card having an independent dedicated server function 126, and third industry standard expansion card having an independent dedicated server function 128, is coupled to first dedicated communication connector 134, second dedicated communication connector 136, and third dedicated communication connector 138 respectively. These connectors are preferably independent and dedicated to a single circuit card. However, it is contemplated that pins in a single connector could be shared by two or more independent dedicated server circuit cards. It is, nevertheless, preferred that multiple server cards do not use the same pins in a connector, except for power provisioning pins, grounds, etc. The system 100 could have a power input connection 140 coupled to some external power source (not shown) and to an internal shared power supply 110.

In operation, the apparatus and method of the present invention could function as follows: a chassis 101 is populated with a first industry standard expansion card having an independent dedicated server function 124, and a second industry standard expansion card having an independent dedicated server function 126. These cards are coupled to industry standard connections first industry standard expansion card slot 114 and second industry standard expansion card slot 116. The only electrical connections with first industry standard expansion card having an independent dedicated server function 124, and second industry standard expansion card having an independent dedicated server function 126, is a power provisioning connection via shared power supply 110 and power distribution line 112. First industry standard expansion card having an independent dedicated server function 124 and second industry standard expansion card having an independent dedicated server function 126, communicate with the outside world and each other via dedicated external connections to first dedicated communication connector 134 and second dedicated communication connector 136 respectively. There are no direct communications between first industry standard expansion card having an independent dedicated server function 124 and any system communication bus.

Throughout this description, reference is made to an industrial PC because it is believed that the beneficial aspects of the present invention would be most readily apparent when used in connection with industrial PCs; however, it should be understood that the present invention is not intended to be limited to industrial PCs and should be hereby construed to include other non-industrial PCs as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

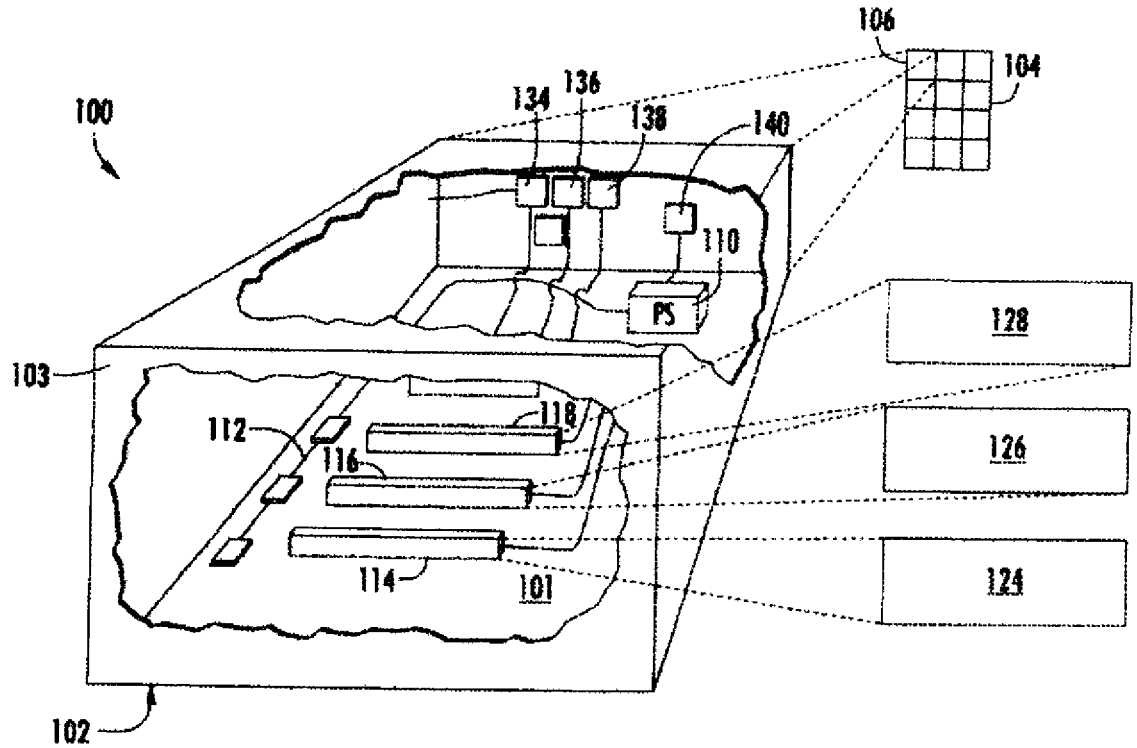

The invention claimed is:

1. A computer system comprising:
   a chassis, having a plurality of slots thereon each configured for receiving one of a plurality of planar shaped circuit cards therein;
   a shroud coupled to said chassis to form an enclosure about said plurality of planar shaped circuit cards;
   said plurality of planar shaped circuit cards each configured for providing an independent dedicated server function; and,
   each of said plurality of planar shaped circuit cards being configured so as to be free from any direct communication connection with any inter-card bus inside said enclosure.

2. A system of claim 1 wherein said plurality of planar shaped circuit cards comprises a first card providing an email server function; a second card providing a web server function; and a third card providing a file storage function.

3. A system of claim 1 wherein power is provided to said plurality of planar shaped circuit cards by a sole power supply.

4. A system of claim 1 wherein said plurality of slots comprises a plurality of industry standard slots, each of which is configured for mechanical and electrical cooperation with one of said plurality of planar shaped circuit cards via an industry standard expansion slot.

5. A system of claim 4 wherein said plurality of industry standard slots are ISA slots.

6. A system of claim 4 wherein said plurality of industry standard slots are PCI slots.

7. A system of claim 4 wherein said industry standard expansion slot includes a plurality of traces, all of which, except for those traces dedicated to provision of power, are unused by said plurality of planar shaped circuit cards.

8. A system of claim 7 wherein said plurality of planar shaped circuit cards comprises a first card providing an email server function; a second card providing a web server function; and a third card providing a file storage function.

9. A system of claim 8 wherein power is provided to said plurality of planar shaped circuit cards by a sole power supply.

10. A system of claim 9 wherein said plurality of industry standard slots are PCI slots.

11. A method of providing computing functions comprising:
   providing a chassis having a power supply and a plurality of industry standard expansion slots;
   providing a first industry standard expansion card, which is dedicated to providing a first single server function;
   providing a second industry standard expansion card, which is dedicated to providing a second single server function;
   providing a single common source of power for said first industry standard expansion card and said second industry standard expansion card;
   providing a dedicated communication line from said first industry standard expansion card to an external connector;
   providing a dedicated communication line first said second industry standard expansion card to an external connector;
   prohibiting direct communication from said first industry standard expansion card to a bus extending between said plurality of industry standard expansion slots; and,
   prohibiting direct communication from said second industry standard expansion card to a bus extending between said plurality of industry standard expansion slots.

* * * * *

UNITED STATES PATENT AND TRADEMARK OFFICE
CERTIFICATE OF CORRECTION

PATENT NO. : 7,191,274 B1 Page 1 of 1
APPLICATION NO. : 09/682323
DATED : March 13, 2007
INVENTOR(S) : Matthew J. Poduska It is certified that error appears in the above-identified patent and that said Letters Patent is hereby corrected as shown below:

In Claim 11, column 4, line 49, please delete the word "first" and substitute therefor --from--.

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,191,274 B1  
APPLICATION NO. : 09/682323  
DATED : March 13, 2007  
INVENTOR(S) : Matthew J. Poduska Page 1 of 2

It is certified that error appears in the above-identified patent and that said Letters Patent is hereby corrected as shown below:

The Title Page, showing an illustrative figure should be deleted and substitute therefor the attached title page.

Please replace the informal Figure 1 with the formal Figure 1 shown below.

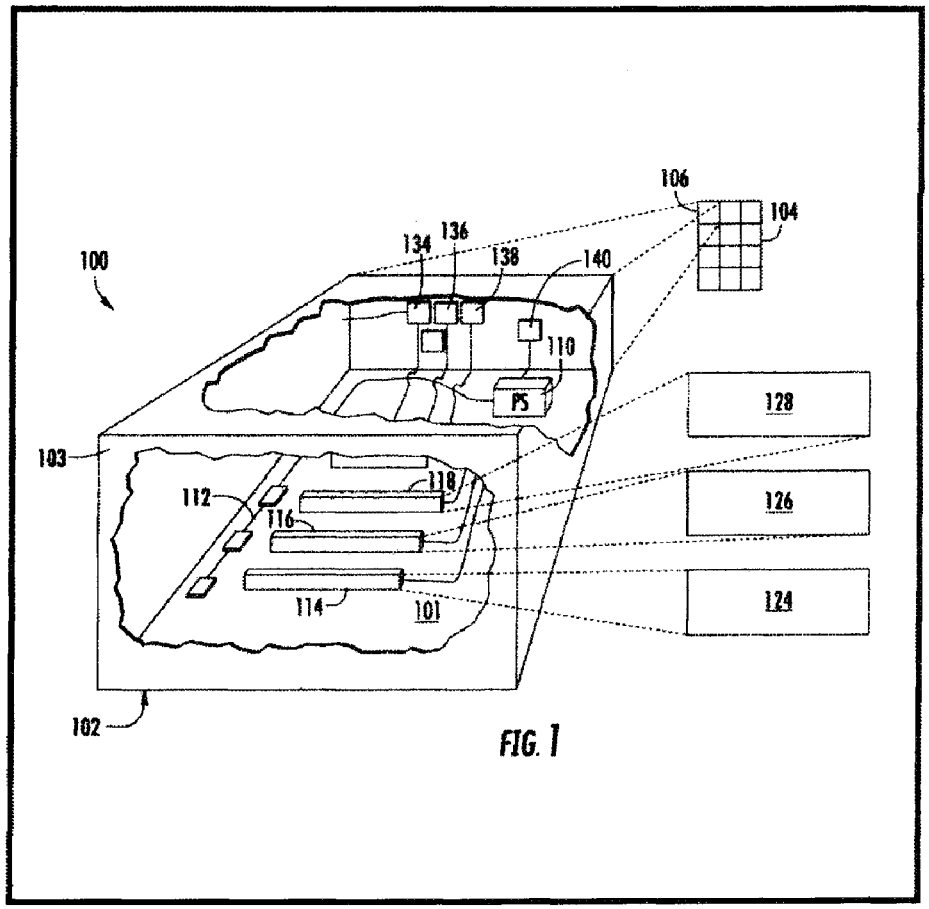

Signed and Sealed this

Fourteenth Day of February, 2012

David J. Kappos
*Director of the United States Patent and Trademark Office*

(12) United States Patent
Poduska

(10) Patent No.: US 7,191,274 B1
(45) Date of Patent: Mar. 13, 2007

(54) METHOD AND SYSTEM FOR PROVIDING INDEPENDENT SERVER FUNCTIONALITY IN A SINGLE PERSONAL COMPUTER

(75) Inventor: Matthew J. Poduska, Center Point, IA (US)

(73) Assignee: Crystal Group Inc., Hiawatha, IA (US)

( * ) Notice: Subject to any disclaimer, the term of this patent is extended or adjusted under 35 U.S.C. 154(b) by 1209 days.

(21) Appl. No.: 09/682,323

(22) Filed: Aug. 20, 2001

(51) Int. Cl.
    G06F 13/00 (2006.01)
(52) U.S. Cl. .................................. 710/300; 710/301
(58) Field of Classification Search .......... 710/300, 710/301, 302, 104; 709/238, 250; 312/223.2; 361/683, 803
See application file for complete search history.

(56) References Cited

U.S. PATENT DOCUMENTS

| | | | |
|---|---|---|---|
| 5,852,725 A * | 12/1998 | Yen | 710/301 |
| 6,490,156 B2 * | 12/2002 | Chen | 361/686 |
| 6,591,324 B1 * | 7/2003 | Chen et al. | 710/302 |
| 6,611,423 B2 * | 8/2003 | Chen | 361/683 |
| 6,611,870 B1 * | 8/2003 | Asano et al. | 709/238 |
| 6,668,251 B1 * | 12/2003 | Goldberg | 707/5 |
| 6,691,295 B2 * | 2/2004 | Williams | 716/12 |

* cited by examiner

Primary Examiner—Khanh Dang
(74) Attorney, Agent, or Firm—Simmons Perrine PLC

(57) ABSTRACT

A system and method for providing the functionality of independent dedicated servers in a space savings and heat dissipation limited design, including a PC having a plurality of independent dedicated server cards which do not communicate over the PC system bus and only receive power therefrom. Communication with the server cards is done by independent pin connections on the exterior of the PC housing.

11 Claims, 1 Drawing Sheet